Nov. 17, 1931.                J. HAGGARD                1,831,858
PROCESS OF MAKING ARTIFICIAL STONE PRODUCTS
Original Filed June 24, 1929
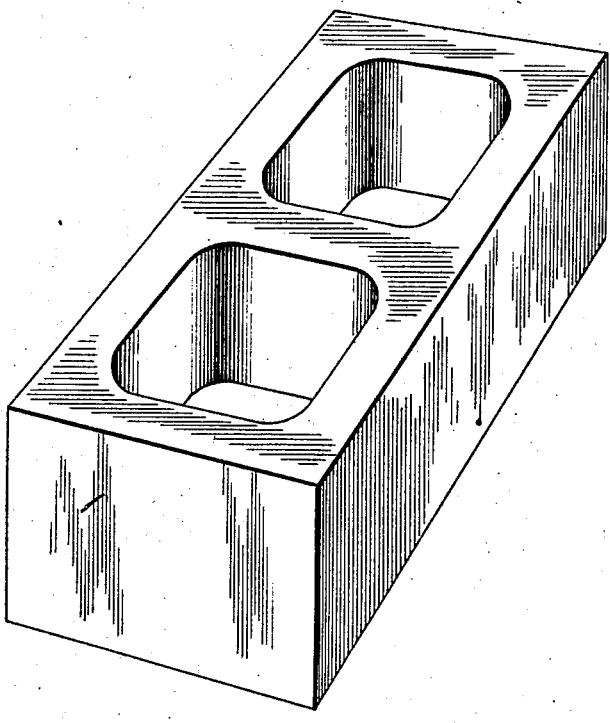
Composition
- Granulated Gypsite _____ 1%
- Hydrated Lime _____ 8½%
- Waterproofing _____ ½ of 1%
- Vesicular aggregate _____ 90%
Inventor
Jerre Haggard
By Fred'k Transom
Attorney

UNITED STATES PATENT OFFICE

JERRE HAGGARD, OF EL PASO, TEXAS, ASSIGNOR TO THE ATLAS LIME COMPANY, INC., OF EL PASO, TEXAS, A CORPORATION OF TEXAS

PROCESS OF MAKING ARTIFICIAL STONE PRODUCTS

Original application filed June 24, 1929, Serial No. 370,886. Divided and this application filed March 1, 1930. Serial No. 432,542.

My invention relates to the fabrication of building material units which may be given various forms, shapes and sizes, according to the particular use and purpose in view. It has been successfully applied to the manufacture of roofing tiles, drain pipe, foundation blocks, bricks, partition slabs etc.

One object of the invention is to provide a durable and good weathering building unit of economical manufacture.

Another object of the invention is to combine lightness, strength and sufficient hardness in units of the kind described.

Another object is to use raw materials whose physical and chemical properties render them suitable to combine into a homogeneous mass under the process treatment explained in this specification.

Another object is to obtain a concrete material which will mould, roll or press up into clean, sharply defined articles of manufacture for the uses indicated.

Another object is to utilize a novel hardening process for the manufacture of articles indicated from certain materials, as described.

Other objects and advantages will appear as the invention is described in detail.

The single figure of the drawing shows in perspective one type of building unit, with a table of ingredients used in the invention.

In the manufacture of building units of the kind described a number of considerations determine the availability of the raw materials that can be used, as well as the quality of the product when made up. Primarily every ingredient used must be cheap and plentiful, also fairly uniform in physical and chemical properties. The ingredients used must, furthermore, mix to advantage with the aim of getting a final product superior in concrete properties to any one of the ingredients alone, and for the purposes of this invention the mixed mass must mould, roll or press up into clean, sharply defined articles of manufacture for the uses indicated.

These several considerations, with others, such for instance, the ability to build into sound proof inclosures, good plaster retention, ability to hold nails, lightness, strength and toughness, with freedom from moisture collection have resulted in innumerable experiments of particular mixtures and bonding processes for same, to cause them to retain any desired shapes under load.

Generally speaking the bonding processes may be divided into those using firing operations, to bring about more or less fusion between the different ingredients of the mixture and those depending upon a chemical reaction, as illustrated by the different kinds of cement and mortars. For some purposes, manufacture of refractories, etc., the firing processes are best, for others the chemical action gives as good and sometimes better results, this invention uses a process of the latter class.

As indicated on the drawing the ingredients used in the building unit material of this invention, and their approximate amounts are: A vesicular aggregate of about 90% of the final mixture. This aggregate may be derived from a considerable range of rocks, both as to variety and size, even down to spalls, and I have found screenings large enough to preserve a vesicular structure also give excellent results. For certain grades of work a considerable variety of cinders have also been found to make a serviceable aggregate in combination with the other ingredients indicated, particularly good results being obtained with a class of cinders known commercially as "fire box cinders".

With this aggregate, in substantially the amount stated of hard rock, such as basalt, or a resistant cinder, it is found sufficient to add about 1% of granulated gypsite, which is an earthy, disintegrated gypsum rock occurring in great deposits in several parts of the United States. The vesicular aggregate and the gypsite are thoroughly ground together. During this grinding process about 8½% of hydrated lime is fed to the mixture. When these ingredients have been thoroughly mixed and reduced to the desired grade of fineness, which varies to some extent with different classes of work, a small amount of water-proofing composition, about ½ of 1% is added, together with sufficient water to bring the mass to a plastic composition, suitable for working in moulds, presses, etc.

After the units have been brought to the required shape by whatever means that may be chosen they are subjected to a curing process involving exposure to steam treatment for a period of several hours. Preferably this steaming is done by exposure in sealed containers to steam of a slight pressure above the atmosphere and in the initial stages of the treatment, having a slight degree of superheat. As the units begin to harden this degree of superheat is increased, at the same time holding the pressure of the steam only a few pounds above the atmosphere. This degree of superheat may be pushed to a temperature up to 150 degrees C. above which the gypsum content of the gypsite begins to change over to anhydride, in which form it does not react as favorably in the hardening process as the unaltered gypsum rock which acts as a retarder during the moisture abstraction process.

A number of attempts have been made to introduce gypsum as an ingredient in artificial stone building units, using a firing process, but due to the molecular changes brought about by the intense heat of such processes applied to gypsum products, the final result in many cases is loss of cohesion, brittleness and distortion. It has been found, on the contrary, that when gypsum is added as above explained, combined with hydrated lime and cured at suitable temperatures under a controllable steam application of the heat, that a very superior building unit of even complicated shapes can be produced.

Artificial stone units, fabricated as explained above, have moreover, been found to show a very slight moisture absorption in use, which is a highly desirable quality in such articles. It is well known that lime bonded bricks have a much lower absorption than cement bonds, and because of the earthy nature of the gypsite filler material used in the units of this invention hardening stresses are largely eliminated while the closure of the aggregate vesicles is exceptionally close and homogenous.

As a water-proofing compound I have found a double colloidal silicate of calcium and aluminum to give excellent results, but the more usual sodium silicate can also be used. Any desired color in the units manufactured can be had by suitable pigments added as a final step in the mixing operation, however, the lime and gypsite ingredients alone give a good natural color with most aggregates.

This application is a division of application Serial No. 370,886, filed June 24, 1929, title—Artificial stone—Patent No. 1,793,172.

What is claimed as new is:

1. The process of making artificial stone units which consists in grinding together a vesicular aggregate, lime and gypsite and subsequently applying heat by a steam controlled operation.

2. An apertured artificial stone unit in which the area of the apertures bears a considerable ratio to the area of the unit walls, the material of the walls consisting of a mixture of gypsite, lime and a vesicular aggregate, indurated by steam treatment at a temperature less than, or slightly above, 150 degrees C.

3. A formed concrete unit provided with apertures, surrounded by walls relatively thin with respect to the aperture areas, said walls being made of a material composed of lime, a gypsite filler, and a vesicular aggregate, hardened as a concrete under a temperature of approximately 150 degrees C.

4. The process of hardening a concrete material containing gypsum, lime and a vesicular aggregate, which consists in heating a mixed mass of these materials by steam treatment to a temperature low enough to avoid changing the gypsum content to anhydride.

5. A process of drying and hardening artificial stone units made of a material containing gypsum, lime and a vesicular aggregate which consists in heating a mixed mass of these materials, shaped as a finished unit, under low pressure steam of a slight degree of superheat and gradually increasing the amount of superheat to a temperature less than sufficient to decompose the gypsum.

6. A concrete artificial stone unit of a material containing gypsum, lime and a vesicular aggregate, hardened by steam treatment.

7. The process of preparing artificial stone units which consists in reducing a vesicular aggregate to a uniform size, mixing it with gypsite and lime to a plastic consistency, shaping the unit, and hardening it by exposure to steam.

8. The process of making an artificial stone unit which consists in grinding together gypsite, lime and a vesicular aggregate in the dry and adding sufficient water to form a plastic mass, adapted to shaping operations such as moulding, pressing or rolling to definite shapes.

9. A building material formation process consisting in adding substantially 8½% hydrated lime, and 1% granulated gypsite to 90% vesicular aggregate in a dry grinding operation and tempering with water containing a small amount of water-proofing colloids.

10. The process of fabricating artificial stone products which consists in grinding together cinders and gypsite with the addition of lime and sufficient water to form a coherent plastic mass, moulding the mass into any desired shape, and exposing it to steam treatment until hardened.

11. The process of fabricating artificial stone which consists in grinding together cinders and gypsite to a uniform size, adding hydrated lime during the grinding operation and sufficient water and double colloidal silicates of calcium and aluminum to make a plastic mass which is finally heated under steam pressure to solidity.

JERRE HAGGARD.